United States Patent
Zhai et al.

(10) Patent No.: US 8,975,326 B2
(45) Date of Patent: Mar. 10, 2015

(54) CARBON NANOTUBE OR GRAPHENE-BASED AEROGELS

(76) Inventors: Lei Zhai, Oviedo, FL (US); Jianhua Zou, Orlando, FL (US)

( * ) Notice: Subject to any disclaimer, the term of this patent is extended or adjusted under 35 U.S.C. 154(b) by 882 days.

(21) Appl. No.: 13/048,040

(22) Filed: Mar. 15, 2011

(65) Prior Publication Data

US 2011/0224376 A1    Sep. 15, 2011

Related U.S. Application Data

(60) Provisional application No. 61/313,914, filed on Mar. 15, 2010.

(51) Int. Cl.
| | | |
|---|---|---|
| *C08G 18/42* | (2006.01) | |
| *B32B 7/12* | (2006.01) | |
| *C08F 230/08* | (2006.01) | |
| *B01J 13/00* | (2006.01) | |

(52) U.S. Cl.
CPC ........... *C08F 230/08* (2013.01); *B01J 13/0091* (2013.01); *C08F 2438/03* (2013.01)
USPC .......................................... 524/500; 524/186

(58) Field of Classification Search
USPC ......................................................... 525/186
See application file for complete search history.

(56) References Cited

U.S. PATENT DOCUMENTS

| | | | |
|---|---|---|---|
| 8,058,364 B2 * | 11/2011 | Wang et al. ................... | 525/524 |
| 2004/0246650 A1 * | 12/2004 | Grigorov et al. ............. | 361/212 |
| 2009/0118420 A1 | 5/2009 | Zou et al. | |

OTHER PUBLICATIONS

Mateusz B. Bryning, et al., "Carbon Nanotube Aerogels", Advanced Materials, 2007, 19, pp. 661-664, Wiley-VCH Verlag GmbH & Co. KGaA, Weinheim.

Olga Matarredona, et al., "Dispersion of Single-Walled Carbon Nanotubes in Aqueous Solutions of the Anionic Surfactant NaDDBB", J. Phys. Chem. Aug. 2003. vol. 107, pp. 13357-13367. American Chemical Society.

Amit Bhattacharya, et al., "Polymer Grafting and Crosslinking", John Wiley & Sons, Inc. Publication. 2009, Title Page, Table of Contents and p. 3 only.

* cited by examiner

*Primary Examiner* — Ling Choi
*Assistant Examiner* — Thuy-Ai Nguyen
(74) *Attorney, Agent, or Firm* — Jetter & Associates, P.A.

(57) ABSTRACT

An aerogel includes a plurality of supramolecular structures bound to one another. Each supramolecular structure includes a carbon nanotube (CNT) or graphene type structure having an outer surface, and a plurality of polymers or aromatic molecules secured to the outer surface of the CNT or graphene type structure. The plurality of polymers or aromatic molecules have at least one crosslinkable structure. The supramolecular structures are crosslinked together by chemical bonding between the crosslinkable structures. The polymers can be block copolymers including at least one conjugated polymer block and at least one block of a crosslinkable non-conjugated polymer that provides the cross linkable structure, where the conjugated polymer block is non-covalently bonded to the outer surface of the CNT or graphene type structure.

16 Claims, 13 Drawing Sheets

Crosslinkable copolymers

Crosslinking through hydrolysis:

Poly (3-alkylthiophene)-b- poly (3-(trimethoxysilyl) propyl methacrylate)
Poly (3-alkylthiophene)-b- poly (3-(diethoxymethylsilyl) propyl methacrylate)
Poly (3-alkylthiophene)-b- poly (3-(trimethoxysilyl) propyl acrylate)

The alkyl chain carbon number ranges from 4 to 20.

Poly (aryleneethynylene)-b- poly (3-(trimethoxysilyl) propyl methacrylate)
Poly (aryleneethynylene)-b- poly (3-(diethoxymethylsilyl) propyl methacrylate)
Poly (aryleneethynylene)-b- poly (3-(trimethoxysilyl) propyl acrylate)

Crosslinking through irradiation:

Poly (3-alkylthiophene)-b- poly (glycidyl methacrylate)
Poly (3-alkylthiophene-b- poly (glycidyl acrylate)
Poly (aryleneethynylene)-b- poly (glycidyl methacrylate)
Poly (aryleneethynylene)-b- poly (glycidyl acrylate)
Above polymers can be crosslinked by irradiation with the presence of quaternary ammonium dithiocarbamate or by adding diamine Crosslinking through thermal:

Poly (3-alkylthiophene)-b- poly (chloromethylstyrene)
Poly (aryleneethynylene)-b- poly (chloromethylstyrene)

Above polymers can be thermal crosslinked

*FIG. 1A*

Aromatic molecules with crosslinkable groups

1. Pyrene series

Crosslinking through hydrolysis:

Pyrene -poly (3-(trimethoxysilyl) propyl methacrylate)
Pyrene -poly (3-(diethoxymethylsilyl) propyl methacrylate)
Pyrene -poly (3-(trimethoxysilyl) propyl acrylate)

The alkyl chain carbon number ranges from 4 to 20.

Pyrene -poly (3-(trimethoxysilyl) propyl methacrylate)
Pyrene -poly (3-(diethoxymethylsilyl) propyl methacrylate)
Pyrene -poly (3-(trimethoxysilyl) propyl acrylate)

Crosslinking through irradiaton:

Pyrene -poly (glycidyl methacrylate)
Pyrene -poly (glycidyl acrylate)
Pyrene -poly (glycidyl methacrylate)
Pyrene -poly (glycidyl acrylate)
Above polymers can be crosslinked by irradiation with the presence of quaternary ammonium dithiocarbamate or by adding diamine Crosslinking through thermal:

Pyrene -poly (chloromethylstyrene)
Pyrene -poly (chloromethylstyrene)

Above polymers can be thermal crosslinked

2. Porphyrin series

Crosslinking through hydrolysis:

Porphyrin -poly (3-(trimethoxysilyl) propyl methacrylate)
Porphyrin -poly (3-(diethoxymethylsilyl) propyl methacrylate)
Porphyrin -poly (3-(trimethoxysilyl) propyl acrylate)

The alkyl chain carbon number ranges from 4 to 20.

Porphyrin -poly (3-(trimethoxysilyl) propyl methacrylate)
Porphyrin -poly (3-(diethoxymethylsilyl) propyl methacrylate)
Porphyrin -poly (3-(trimethoxysilyl) propyl acrylate)

Crosslinking through irradiation:

Porphyrin -poly (glycidyl methacrylate)
Porphyrin -poly (glycidyl acrylate)
Porphyrin -poly (glycidyl methacrylate)
Porphyrin -poly (glycidyl acrylate)
Above polymers can be crosslinked by irradiation with the presence of quaternary ammonium dithiocarbamate or by adding diamine Crosslinking through thermal:

Porphyrin -poly (chloromethylstyrene)
Porphyrin -poly (chloromethylstyrene)

Above polymers can be thermal crosslinked

*FIG. 1B*

CARBON NANOTUBE OR GRAPHENE-BASED AEROGELS

CROSS REFERENCE TO RELATED APPLICATIONS

This application claims the benefit of Provisional Application Ser. No. 61/313,914 entitled "CARBON NANOTUBE OR GRAPHENE-BASED AEROGELS", filed Mar. 15, 2010, which is herein incorporated by reference in its entirety.

FEDERAL RIGHTS

The U.S. Government has rights to subject matter disclosed herein based on National Science Foundation CAREER award DMR 0746499.

FIELD

Disclosed embodiments relate to aerogels comprising a plurality of polymers or aromatic molecules attached to carbon allotropes including graphene comprising materials or carbon nanotubes (CNTs).

BACKGROUND

Driven by the potential applications of CNTs with unique electrical and mechanical properties, intensive research effort has been dedicated to assembling CNTs into various bulk materials. For example, CNT sheets (bucky paper) represents one of the most attractive CNT bulk materials, and is considered by some as an alternative to indium tin oxide (ITO) for transparent electrically conductive electrodes. CNT spun fibers can combine both high strength and high stiffness derived from individual CNTs. The vertically aligned CNT forest has found important applications in field emission displays and flexible energy storage devices.

Among various CNT bulk materials, CNT aerogels represent a new material that integrates the merits of CNTs with their intriguing intrinsic properties and aerogel with their unique structure and related properties. Aerogels are attractive in various applications owning to their highly porous structure, low bulk density, and large specific surface area. While their composition varies from silica, metal oxides and polymers to carbon based materials, aerogels allow a wide range of applications including, but not limited to, thermal and acoustic insulating materials, catalyst support, and electrodes for supercapacitors.

CNT aerogels are conventionally produced through extracting the liquid component out of a wet gel that was prefabricated from a precursor solution by a solution-processed approach. Due to the difficulties in dispersing CNT with appropriate dispersants, fabrication of CNT aerogels is challenging with only few reported successful examples. During the process of producing CNT sheets and drawing nanotube fibers, aerogels were produced as intermediate phases, which are not free-standing monoliths, and eventually collapse into dense structures. Only one free-standing CNT aerogel has been reported to have been fabricated through a solution-processed approach, in which CNT aerogel was derived from a CNT wet gel formed by sodium dodecylbenzene sulfonate (NaDDBS) dispersed CNTs. Due to the low mechanical strength of the CNT aerogel obtained, poly vinyl alcohol (PVA) was incorporated for reinforcement, which undesirably decreased the electrical conductivity and increased the density of the aerogel.

SUMMARY

Aerogels disclosed herein comprise a plurality of supramolecular structures bound to one another, each supramolecular structure comprising a CNT or a graphene comprising structure having an outer surface, where a plurality of polymers or aromatic molecules are secured to the outer surface of the CNT or graphene comprising structures. The polymers or aromatic molecules have at least one crosslinkable structure. The supramolecular structures are crosslinked together by chemical bonding between the cross linkable structures. As used herein, the term "aerogel" for disclosed aerogels have a density <500 mg/cm$^3$.

The plurality of polymers can comprise block copolymers comprising at least one conjugated polymer block and at least one block of a crosslinkable non-conjugated polymer that provides the cross linkable structure. In this embodiment the conjugated polymer block is non-covalently bonded to the outer surface of the CNT or graphene comprising structure. The block copolymers can provide the only polymers for the aerogel.

Aerogels disclosed herein can provide unique properties. For example, free standing monolithic polymer/CNT or graphene-based aerogels can provide a surface area ≥300 m$^2$/g, a density <15 mg/cm$^3$ and a 25° C. electrical conductivity ≥1×10$^{-4}$ S/cm. The 25° C. electrical conductivity can be increased to ≥0.1 S·cm$^{-1}$ by a high-current pulse method as described below.

The aerogels disclosed herein are mechanically strong and can be reversely compressed down to <20% of its original volume. The aerogel structure combined with its high surface area, excellent mechanical properties, and high electrical conductivity offers aerogel disclosed herein numerous applications including, but not limited to, chemical sensors, catalyst supports, and novel electrodes. Methods to form such aerogels are also disclosed.

BRIEF DESCRIPTION OF THE DRAWINGS

FIG. 1A is a listing that provides some example crosslinkable copolymers that can be used to form disclosed aerogels, according to an embodiment of the invention.

FIG. 1B is a listing that provides some example aromatic molecules with cross linkable groups that can be used to form disclosed aerogels, according to an embodiment of the invention.

The isotherms of pristine MWCNTs are vertically shifted −100 cm³ STP/g⁻¹ for visual clarity, and BJH mesopore size distribution of MWCNT aerogel (●) and pristine MWCNTs (○), respectively, according to an embodiment of the invention.

Figure 6:
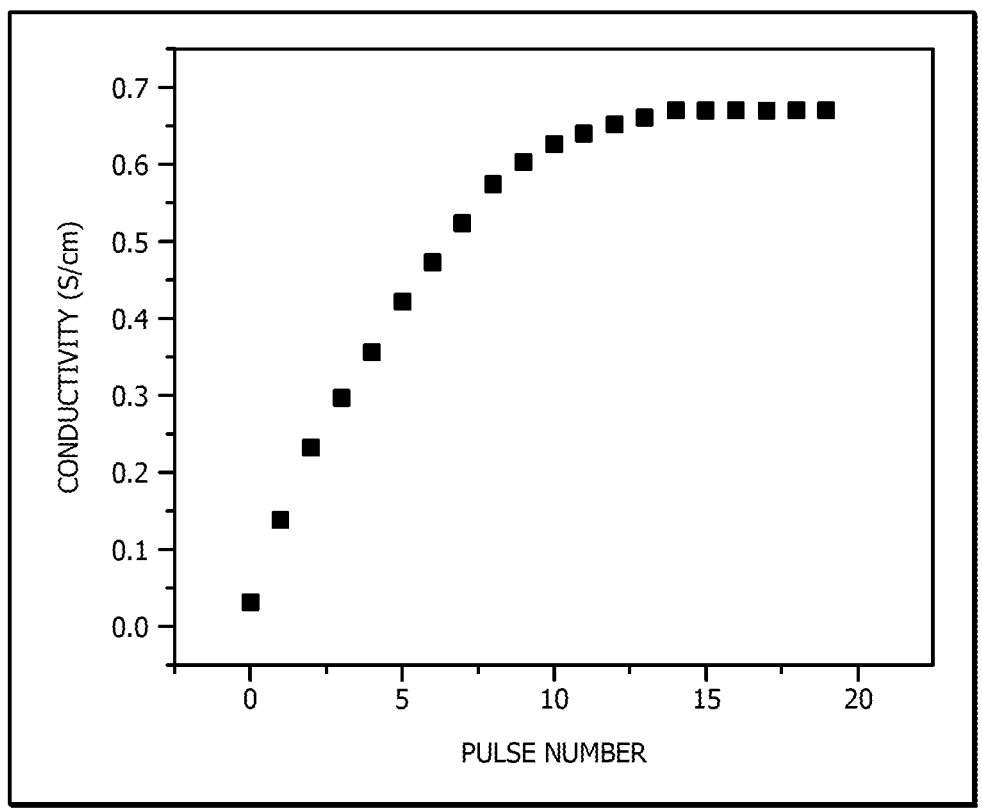

FIG. 6 shows MWCNT aerogel electrical conductivity with the number of 15 ms 100 mA current pulses applied, according to an embodiment of the invention. The electrical conductivity was measured 30 s after each pulse to achieve a steady value.

Figure 7A:
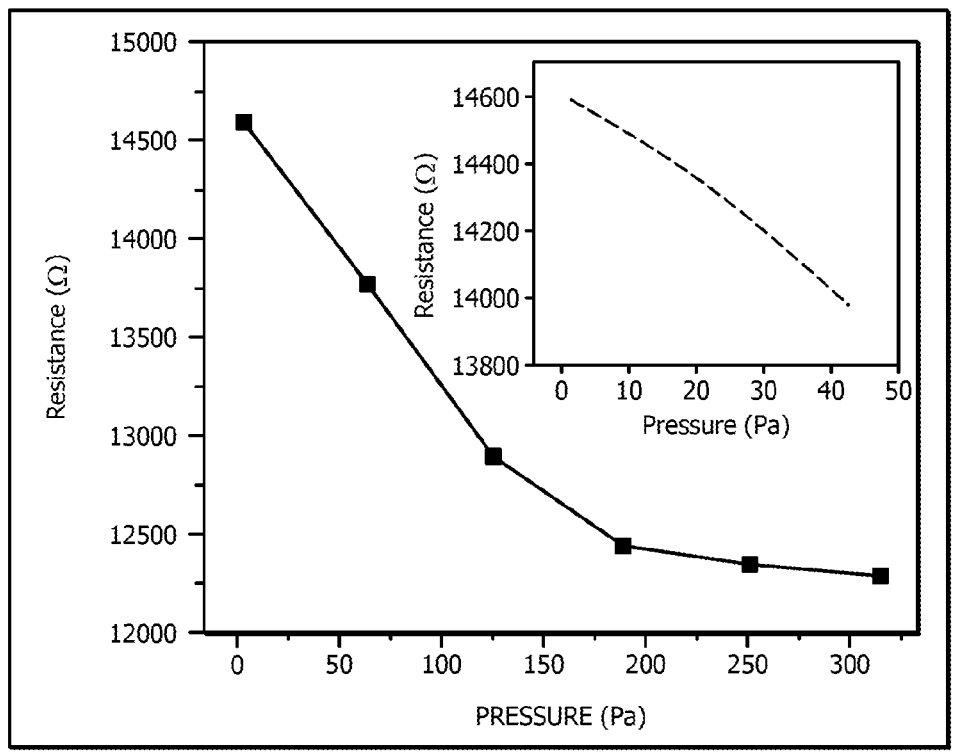

FIG. 7A shows the resistance of an example MWCNT aerogel decreasing linearly with applied pressure from 0 to 180 Pa, according to an embodiment of the invention.

Figure 7B:
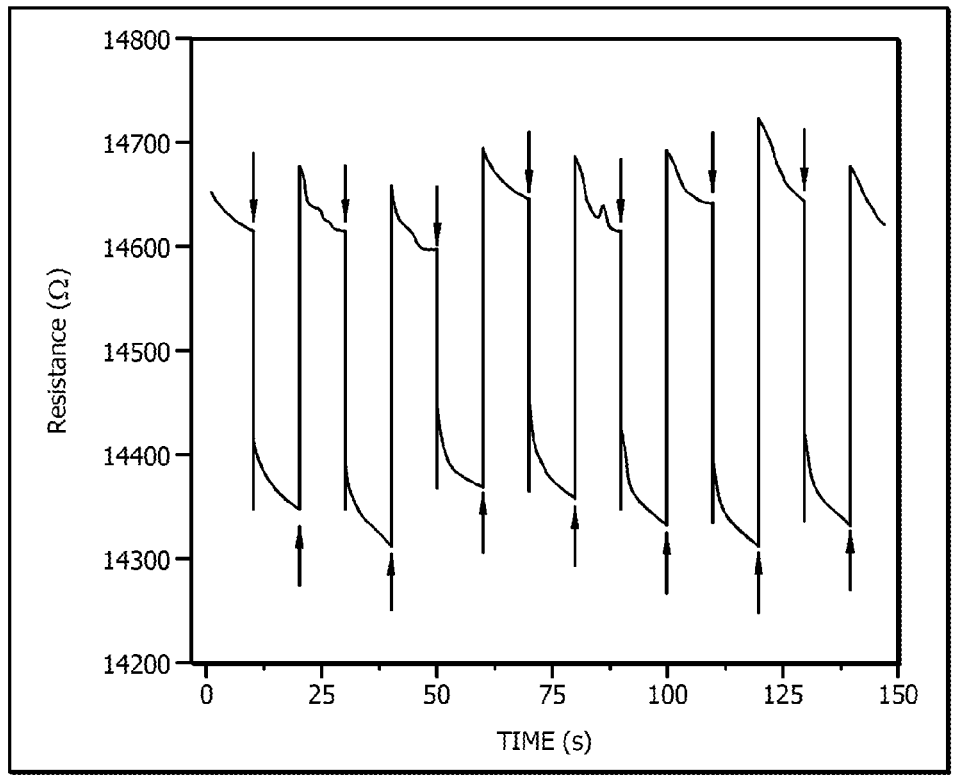

FIG. 7B shows the resistance change of an example MWCNT aerogels in response to repeated loading and unloading of pressure (25 Pa), according to an embodiment of the invention.

Figure 7C:
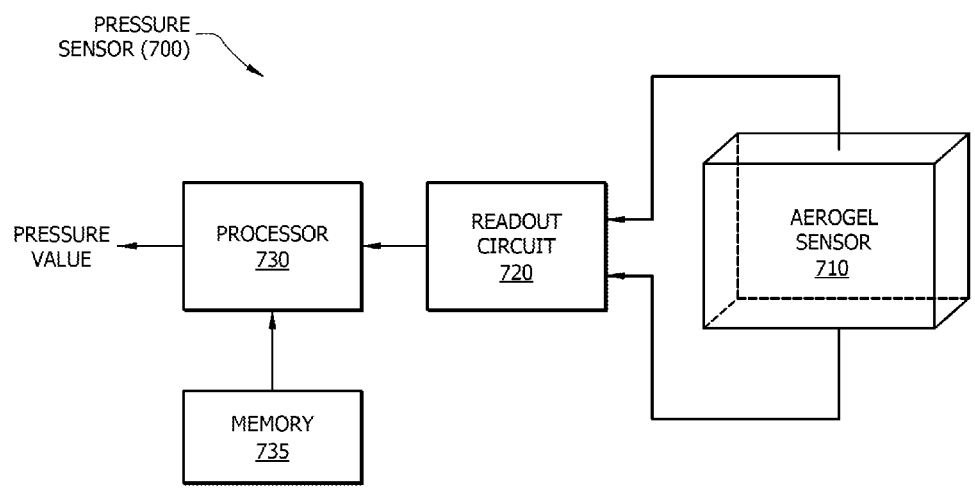

FIG. 7C shows a simplified schematic for an example aerogel-based pressure sensor, according to an embodiment of the invention.

Figure 8A:
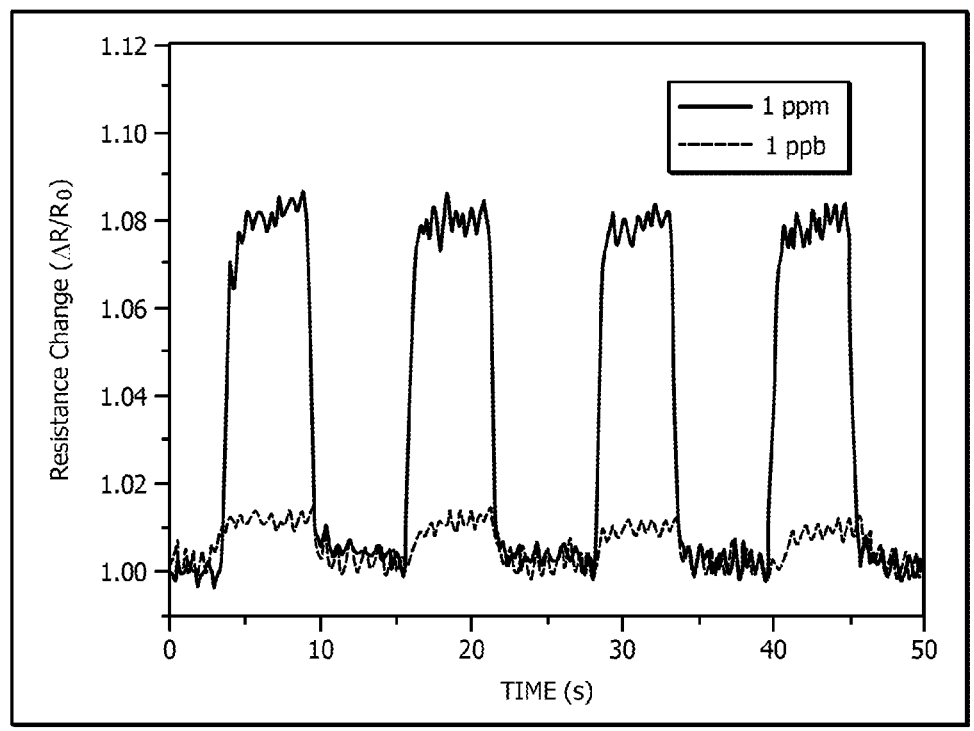

FIG. 8A shows the resistance of an example MWCNT aerogel increasing to a saturated value in 0.5 s upon exposure to chloroform vapor, and completely recovering in 0.5 s upon exposure to air even at very low vapor concentration, according to an embodiment of the invention.

Figure 8B:
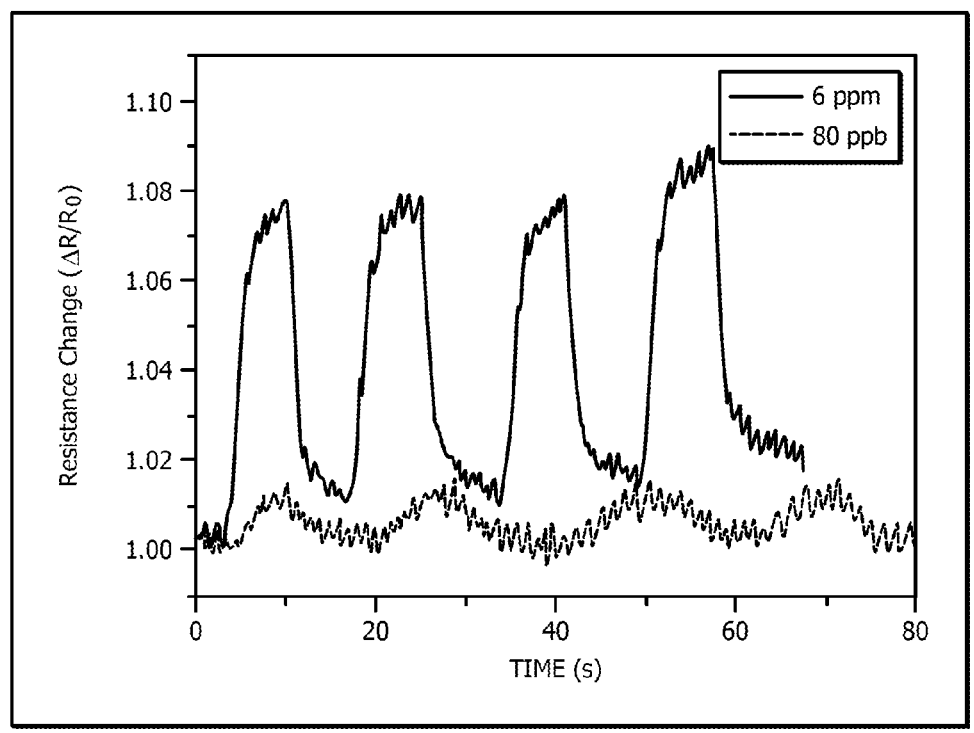

FIG. 8B shows the sensory response of an example MWCNT thin film demonstrating a significantly slower response (4 to 10 s) and much higher detection limit (37 ppb) as compared to disclosed MWCNT aerogels, according to an embodiment of the invention.

Figure 8C:
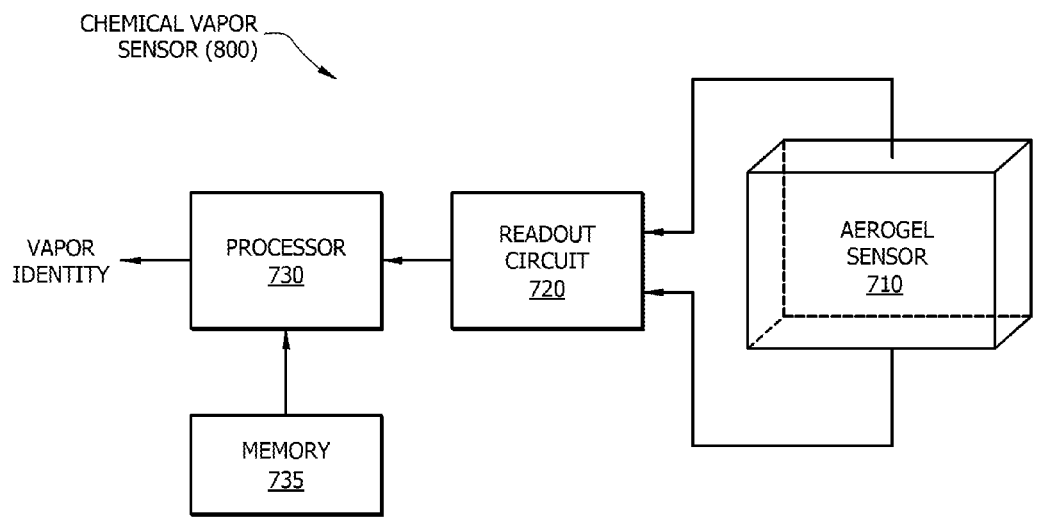

FIG. 8C shows a simplified schematic for an example aerogel-based chemical vapor sensor, according to an embodiment of the invention.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

Disclosed embodiments describe aerogels that comprise a plurality of supramolecular structures attached together, each supramolecular structure comprising a CNT or a graphene comprising structure having an outer surface, where a plurality of polymers or aromatic molecules are secured to the outer surface of the CNT or graphene comprising structure. The polymers or aromatic molecules provide at least one crosslinkable structure. The supramolecular structures are crosslinked together by chemical (e.g., covalent) bonding between the cross linkable structures.

The plurality of polymers can consist essentially of non-conjugated crosslinkable homopolymers. In another embodiment, the plurality of polymers can comprise block copolymers comprising at least one conjugated polymer block and at least one block of a crosslinkable non-conjugated polymer that provides the cross linkable structure, such as groups capable of producing siloxane (Si—O—Si) bond crosslinks through a condensation or elimination reaction. As known in the art of polymer chemistry, a copolymer (or heteropolymer) is a polymer derived from two (or more) monomeric species. Ordinary copolymers are formed using a single polymerization step that includes both monomers, which results in the generation of random copolymers.

A special kind of copolymer is referred to herein as well as in the art as a "block copolymer". Block copolymers are made up of blocks of different polymerized monomers. For example, PS-b-PMMA is short for polystyrene-b-poly(methyl methacrylate) and is commonly fabricated by first polymerizing the monomer styrene, and then subsequently polymerizing the monomer MMA from the reactive end of the polystyrene chains. Such polymers formed from a 2-step polymerization is a "diblock copolymer" because it contains two different chemical blocks. By adjusting the process to add more polymerizations steps that alternate the monomer used, it is easy to see one can also make triblocks, tetrablocks, multiblocks, etc.

The polymers or aromatic molecules can be secured to the outer surface of the CNT or graphene comprising structure by several types of bonds or types of interactions. Conjugated polymers can use π-π electron interactions to bond with CNT or graphene. Non-conjugated polymers can use a hydrophobic interaction or van der Waals interaction to bond with CNT, but this bonding is usually weak as compared to π-π electron interactions. Since CNTs oxidized by strong acids have carboxylic acid on their surface, some materials can also form covalent bonds with CNT via reaction with carboxylic acid groups.

For the block copolymer embodiment, the block copolymer can comprise at least one conjugated polymer block and at least one block of a crosslinkable non-conjugated polymer, wherein the conjugated polymer block is non-covalently bonded to the outer surface of the CNT or graphene comprising structure. In this embodiment, supramolecular structural articles such as aerogels can be formed by crosslinking together supramolecular structures by bonding between respective blocks of the crosslinkable non-conjugated polymer. Due to the crosslinking effect of the crosslinkable non-conjugated polymer which improves the mechanical properties of the aerogel, no additional polymer generally needs to be added.

For the aromatic molecule embodiment, the aromatic molecules can comprise a plurality of fused benzene rings (e.g., pyrene) or a heterocyclic macrocycle (e.g. porphyrin).

As defined herein, supramolecular structural articles (which can also be considered as being assemblies) are well defined complexes of molecules that can be held together by noncovalent bonds (e.g. π-π bonds). Supramolecular structural articles, such as aerogels, as used herein, denote larger complexes of molecules, typically hundreds or thousands of supramolecular structures chemically bound to one another that form sphere, rod (e.g. nanoribbons or nanofibers) or sheet-like species, having dimensions ranging in size from nanometers to micrometers.

The CNTs can comprise MWCNTs, single wall carbon nanotubes (SWCNTs), carbon nanotube fibers (diameter >100 nm) or mixtures thereof. As used herein, graphene comprising structures includes graphene, as well as graphene derivatives including, but not limited to, graphite oxide (GO) and reduced graphite oxide (RGO). Graphene is a flat monolayer of carbon atoms tightly packed into a two dimensional (2D) honeycomb lattice.

Regarding the block copolymer, the crosslinkable non-conjugated polymer blocks can be common step-growth or chain-growth polymers that can be coupled with, grafted to, grafted on, initiate, or terminate a conjugated polymer to form the desired conjugated-block-non-conjugated polymer as long as the non-conjugated polymer is readily dissolved in one or more solvents or a mixture of solvents. The individual non-conjugated polymer block can be linear or branched. The polymers can generally range from stereoregular (tactic) or stereorandom (atactic). When possible the non-conjugated polymer can be regioregular (head to head or head to tail) or regiorandom. The non-conjugated branch can be a copolymer of two or more monomers. Among crosslinkable non-conjugated polymers that can be used for the practice of embodiments of the inventions include poly(3-(trimethoxysilyl) propyl methacrylate) (PTMSPMA). PTMSPMA is an example of a crosslinkable non-conjugated polymer that includes structure for undergoing hydrolysis and condensation in a presence of a suitable cross linking agent. The degree of polymerization of the crosslinkable non-conjugated blocks generally ranges from about 2 to about 1,000.

The conjugated polymers can comprise, for example, poly(3-hexylthiophene) (P3HT), poly(aryleneethynylene), polypyrrole, polydioxythiophene, polydioxypyrrole, polyfluorene, polycarbazole, polyfuran, polydioxyfuran, polyacetylene, poly(phenylene), poly(phenylene-vinylene), poly(arylene ethynylene), polyaniline, polypyridine, poly(thienyllene vinylene), polysilole, poly(dithensilole), poly(dibenzosilole), poly(dithienopyrrole), poly(thiazole), poly(thieno[3,2-6]thiophene), poly(thieno[3,2-6]thiophene vinylene), poly(benzothiadiazole) and any of these polymers that have substitutions such as alkyl, alkenyl, alkynyl, alkoxy, aryl, aryloxy, halogen, ester, or amide. The substituents can be chiral or achiral. The conjugated polymer itself can be a copolymer, for example having the same base conjugated repeating unit but different substituents on different repeating units or different conjugated repeating units. The conjugated polymers with substituents can be regio or stereo regular or regio or stereo random. The degree of polymerization of the conjugated block for the conjugated block polymer or conjugated polymer can generally range from 2 to about 1,000 depending upon the specific blocks ability to form sufficiently strong and stable interactions with the CNTs in the presence of the dispersing solvent. Example crosslinkable non-conjugated polymers include poly(3-(trimethoxysilyl) propyl methacrylate) (PTMSPMA), poly(3-(trimethoxysilyl) propyl acrylate), poly(glycidyl methacrylate), poly(glycidyl acrylate), and poly(chloromethylstyrene).

One exemplary block copolymer is P3HT-b-PTMSPMA. As described below, CNTs were functionalized with P3HT-b-PTMSPMA. P3HT-b-PTMSPMA is a reactive block copolymer that provides at least two (2) functions:

1) dispersing and stabilizing CNTs or graphene comprising structures to individual units in solutions, and 2) introducing permanent chemical bonding interactions between CNTs or graphene comprising structures by the formation of crosslinked polysilsesquioxane through the hydrolysis and condensation of PTMSPMA. Trimethoxysilyl groups of PTMSPM hydrolyze and condense to crosslink the gel. The intense chemical bonding interactions between CNTs or graphene comprising structures are believed to decrease the percolation threshold and lead to the formation of CNT or graphene comprising structure wet gels with low CNT or graphene comprising structure concentration. The removal of the solvent from the wet gel generates ultra-light aerogels with favorable mechanical and electrical properties as described below.

Crosslinkable conjugated block copolymers have been found to provide efficient dispersion of CNTs. However, some oxidized CNTs can be dispersed by non-conjugated polymers such as polyacrylic acid.

FIG. 1A is a listing that provides some example crosslinkable copolymers that can be used to form disclosed aerogels, according to an embodiment of the invention. FIG. 1B is a listing that provides some example aromatic molecules with crosslinkable groups that can be used to form disclosed aerogels, according to an embodiment of the invention.

Some crosslinkable polymers may not need a conjugated block and may still be able to generate aerogels with less efficiently dispersed CNTs or graphene comprising structures to produce aerogels with some CNT or graphene bundling that may have certain applications. For example, as disclosed above, the polymers in the aerogel can consist essentially of non-conjugated crosslinkable homopolymers. For example, some of the block copolymers listed in FIG. 1A with their conjugated part excluded can provide non-conjugated crosslinkable homopolymers that can be used to form disclosed aerogels. In one specific example, poly(glycidyl methacrylate) is a crosslinkable non-conjugated polymer that can form aerogels and is simply poly(3-alkylthiophene)-b-poly(glycidyl methacrylate) listed in FIG. 1A with its conjugated block portion poly(3-alkylhiophene) excluded.

Regarding properties of disclosed aerogels, such aerogels are highly porous and can provide a surface area $\geq 300$ m$^2$/g, ultra-light with a density $<15$ mg/cm$^3$ and a 25° C. electrical conductivity $\geq 1 \times 10^{-4}$ S/cm despite being ultralight. Regarding surface area, for comparison pristine CNTs have a surface area of ~200 m$^2$/g. The ultralight density, high surface area, and high conductivity make the CNT or graphene-based aerogel a good candidate as the electrode for supercapacitor and catalyst supports for low temperature fuel cells.

In one embodiment the aerogel comprises a macroporous honeycomb structure comprising honeycomb cells having honeycomb walls, where the honeycomb walls comprise a plurality of CNTs entangled together. As defined herein, a macroporous honeycomb structures include groups of cylindrical structures having a diameter of 20 to 500 μm that are separated by 50-500 nm thick walls. The aerogel is generally compressible to $<20\%$ of its original volume and recovers to the original volume after release of compression, in a time of less than 1 second. The block copolymer can provide the only polymers in the aerogel, since the aerogel typically provides good mechanical properties without the need to add one or more additional polymers to obtain good mechanical properties.

CNT or graphene-based aerogels can be fabricated by a three-step procedure of dispersing, gelation, and drying. An example method of forming a CNT or graphene comprising structure-based aerogels comprises dispersing a plurality of block copolymers comprising at least one block of conjugated polymer and at least one block of a crosslinkable non-conjugated polymer, a solvent for the block copolymer, and a plurality of CNTs or graphene comprising structures to form a liquid dispersion. The concentration of CNTs or graphene comprising structures in the liquid dispersion is generally at an ultra-low concentration, typically $<1.0$ mg/mL, which has surprisingly found to be sufficient to induce the gelation of CNT or graphene dispersions.

A solid elastic gel comprising a CNT or graphene network comprising the block copolymer is formed from the liquid dispersion. The plurality of blocks of conjugated polymer are non-covalently secured to an outer surface of the CNT or graphene comprising structure, wherein the solid elastic gel includes a portion of the solvent trapped therein. A crosslinking step crosslinks the CNT or graphene network by crosslinking between crosslinkable non-conjugated polymers. A drying step after crosslinking removes the solvent trapped therein to form the CNT or graphene comprising structure-based aerogel. The drying can comprise critical-point-drying or lyophilization.

The crosslinking can comprise adding a cross linking agent that forms crosslinks between respective blocks of the crosslinkable non-conjugated polymer or can be initiated by irradiation or heating. For example, the cross linking agent can initiate hydrolysis and condensation between crosslinkable non-conjugated polymers in adjacent supramolecular structures to form the crosslinks.

In previously disclosed polymer/CNT aerogel formation methods, the CNTs are dispersed by large amount of surfactant due to weak inter-CNT interactions. For this known method, the gel only starts to form at the CNT concentration of at least about 5 mg/mL, which is about 5 to 10 fold more than methods disclosed herein. As note in the Background, the mechanical properties of the previously disclosed CNT gel was so poor that, an additional polymer comprising PVA was added to strengthen the gel. In contrast, in disclosed methods, the gel can be formed at CNT concentrations of <1 mg/ml, such as only 0.5 mg/mL. Moreover, due to the crosslinking effect disclosed herein provided by the crosslinkable non-conjugated polymer, such as PTMSPM, the mechanical properties of the aerogel as formed are significantly improved, so that there is generally no need for an additional polymer to be added.

The unique aerogel structure disclosed herein combined with its high surface area, excellent mechanical properties, and high electrical conductivity offers disclosed aerogels numerous applications including pressure sensors, chemical sensors, catalyst supports such as in low temperature fuel cell, and novel electrodes, such as electrodes for supercapacitors.

EXAMPLES

The following non-limiting Examples serve to illustrate selected embodiments. It will be appreciated that variations in proportions and alternatives in elements of the components shown will be apparent to those skilled in the art and are within the scope of embodiments disclosed herein.

Materials

Poly(3-hexylthiophene)-block-poly(3-(trimethoxysilyl) propyl methacrylate) (P3HT-b-PTMSPMA) was synthesized by reversible addition-fragmentation chain transfer (RAFT) polymerization of 3-(trimethoxysilyl) propyl methacrylate using P3HT trithiocarbonate compound as the RAFT agent. Three P3HT-b-PTMSPMAs with different PTMSPMA molecular weight were synthesized using the same P3HT RAFT agent ($M_{nP3HT}$=8600).

Table 1 shown below lists the number average molecular weight ($M_n$) of the block copolymer P3HT-b-PTMSPMAs and molecular weight of PTMSPMA block ($M_{nPTMSPMA}$), which was calculated by subtracting $M_{nP3HT}$ from $M_n$. MWCNTs were purchased from Nanolab (Diameter of 10-20 nm, length of 5-20 μm, and purity beyond 95%) and were used as-received without further purification or chemical modification.

TABLE 1

Characteristics of three P3HT-b-PTMSPMAs and the critical gelation concentration (CGC) of dispersed MWCNTs.

| P3HT-b-PTMSPMA | 1 | 2 | 3 |
| --- | --- | --- | --- |
| $M_n$ | 18200 | 21600 | 26900 |
| $M_{nPTMSPMA}$ | 9600 | 13000 | 18300 |
| $CGC^a$ | 1.2/0.053% | 0.3/0.014% | 0.3/0.014% |

The numbers represent the mass volume CGC in unit of mg/mL and volume fraction CGC, respectively.

Characterization

The molecular weight of P3HT-b-PTMSPA and P3HT RAFT agent was determined by size exclusion chromatography (SEC, A JASCO HPLC system equipped with PLgel 5 μm MIXED-C column) using polystyrene as standard. Morphology of the MWCNT aerogel was characterized by a scanning electron microscope (SEM, ZEISS ULTRA55). The nitrogen adsorption/desorption experiment was carried out on Nova 4200e. Samples were dried at 130° C. for 4 hours before the measurement. The conductivity of the MWCNT aerogel was measured by a typical four probe conductivity measurement setup (Supporting Information) using Keithley-2400 digital source meter.

Fabrication of MWCNT Aerogel

Pristine MWCNTs were dispersed in chloroform by P3HT-b-PTMSPMA via a sonication of 13 minutes in a vial. According to previous work by the Inventors, P3HT blocks bond to the CNT surface such as a MWCNT surface through π-π interaction and the PTMSPMA block locates at the outer surface of MWCNTs to functionalize and stabilize the MWCNTs in dispersion. The molecular weight of three P3HT-b-PTMSPMAs, 1 mg MWCNTs was dispersed by $8.5 \times 10^{-5}$ mmol P3HT-b-PTMSPMA to achieve a constant PTMSPMA polymer chain density on MWCNT surfaces.

The MWCNT dispersion was kept at room temperature and gelation of the dispersion happened in several minutes to several hours, which was inversely proportional to the MWCNT concentration. The CGC of the MWCNTs was determined as the lowest MWCNT concentration leading to gelation of the dispersion. Depending on the P3HT-b-PTMSPMA used for dispersion, the CGC of MWCNT varied as shown above in Table 1. The obtained MWCNT wet gel was aged for 12 hours at room temperature and then applied to a solvent-exchange process with methanol to remove chloroform. Subsequently, an ammonia aqueous solution (crosslinking agent) was added to crosslink the MWCNT wet gel for 12 hours by the hydrolysis and condensation of PTMSPMA. Shrinkage of the wet gel was observed during this process, indicating successful crosslinking. After exchange with water to remove methanol and ammonia, the wet gel was freeze dried to obtain the MWCNT aerogel.

Figure 2A:
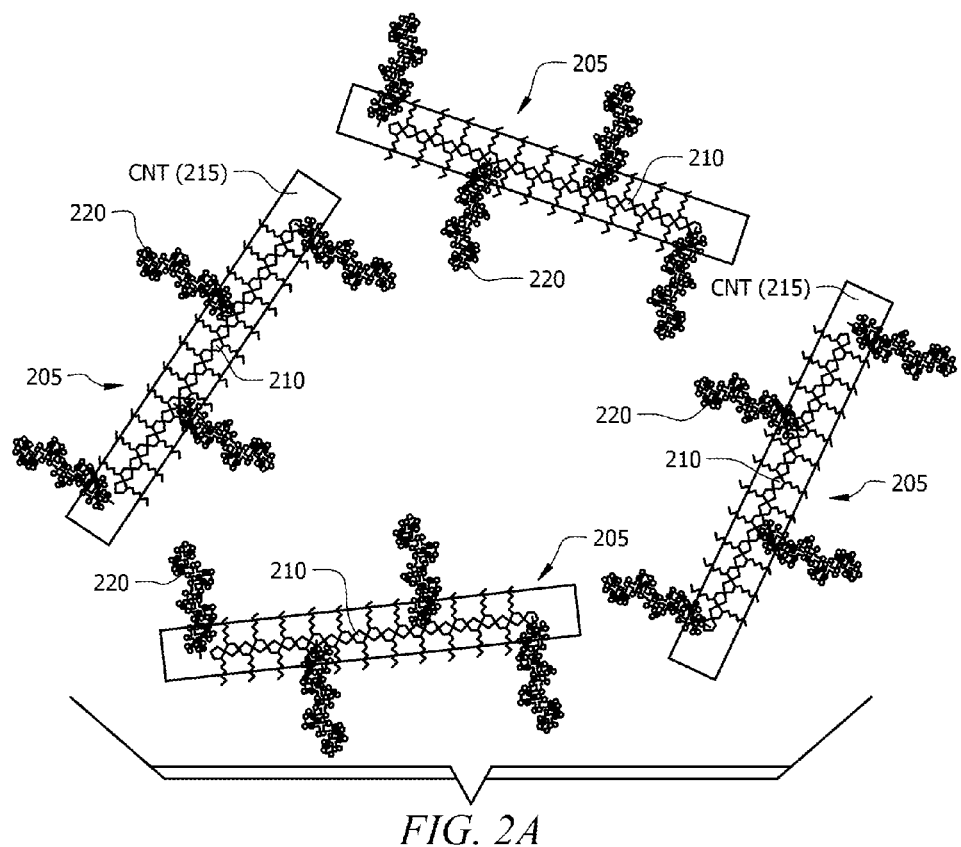
FIG. 2A is a simplified schematic illustration of the structure of example supramolecular structures formed by P3HT-b-PTMSPMA dispersed and then bonded to MWCNTs, according to an embodiment of the invention.
Figure 2B:
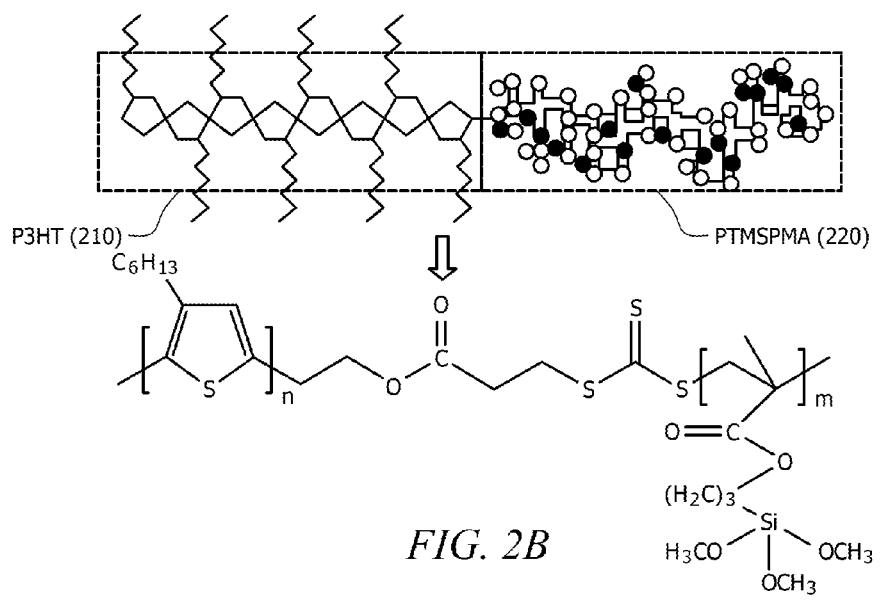
FIG. 2B depicts a P3HT block bound to a PTMSPMA block shown in FIG. 2A, along with the chemical representation of the P3HT block bound to the PTMSPMA block.
Figure 2C:
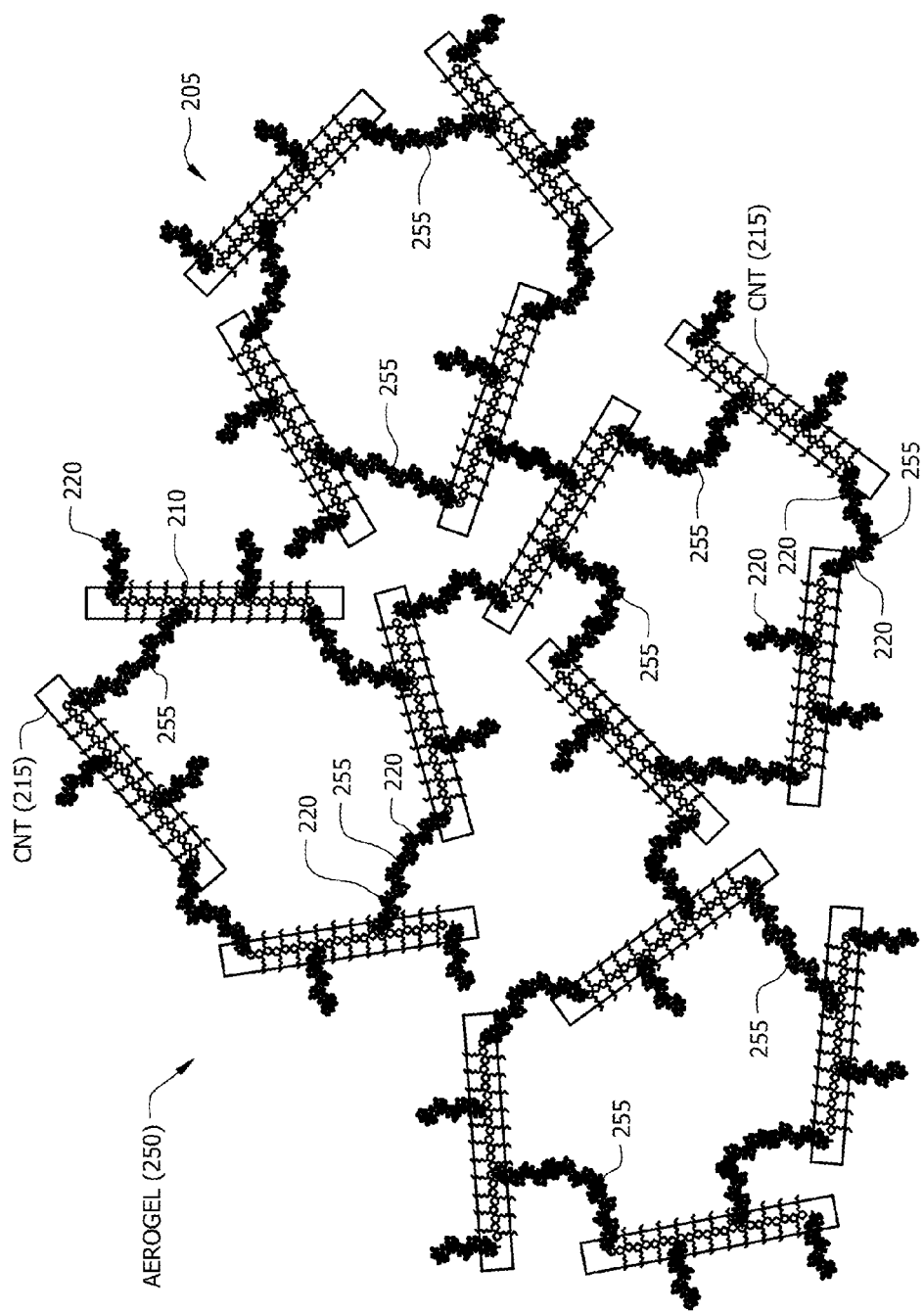
FIG. 2C is a simplified illustration of an example aerogel following gelation of the supramolecular structures shown in FIG. 2A, with siloxane bond crosslinks identified, according to an embodiment of the invention.

FIG. 2A is a simplified schematic illustration of the structure of example supramolecular structures formed by P3HT-b-PTMSPMA dispersed and then bonded to MWCNTs, according to an embodiment of the invention. As shown in FIG. 2A, supramolecular structures 205 comprise P3HT blocks 210 bound to the surface of the MWCNTs 215 through a π-π interaction, with PTMSPMA blocks 220 bound to the P3HT blocks 210 located at and emerging out from the outer surface of MWCNTs 215. FIG. 2B depicts a P3HT block 210 bound to a PTMSPMA block 220 shown in FIG. 2A, along with the chemical representation of the P3HT block 210 bound to a PTMSPMA block 220. After gelation, the supramolecular structures 205 become attached to one another and form a gel comprising a plurality of supramolecular structures crosslinked together through chemical bonding (Si—O—Si (siloxane) bond crosslinks) between the PTMSPMA blocks 220. FIG. 2C is a simplified illustration of an example aerogel 250 following gelation of the supramolecular structures 205 shown in FIG. 2A, with the siloxane bond crosslinks identified as reference 255.

Proposed Mechanism of MWCNT Wet Gel Formation

The lowest CGC of MWCNTs was characterized to be 0.3 mg/mL (See Table 1), which is ten times less than the lowest CGCs reported. Such a low CGC likely indicates the presence of strong interactions between MWCNTs because the percolation threshold is reversibly proportional to the interaction potential between CNTs. The intense interactions may originate from the chemical bonding formed by the hydrolysis and condensation of trimethoxysilyl groups of PTMSPMA.

As illustrated in FIG. 2C, crosslinking of PTMSPMAs 220 from different MWCNTs 215 introduces chemical bonding interactions between the MWCNTs. The proposed chemical bonding interaction induced gelation mechanism was proved by several control experiments. First, MWCNTs dispersed by P3HT homopolymer did not form wet gels indicating the role of PTMSPMA in the wet gel formation. Second, the MWCNT wet gel was found to not be re-dispersible by various approaches including sonication, agitation, dilution, and heating, suggesting that MWCNTs are crosslinked through permanent chemical bonding interactions. Third, when P3HT-b-PTMSPMA itself was sonicated in chloroform for 13 minutes and then kept at room temperature for 12 hours, the polymer became insoluble, which was analyzed to be due to the hydrolysis and condensation of PTMSPMA block. Forth, in contrast to the formation of physical interaction mediated wet gel, which is usually triggered by cooling the sol precursor down to a certain temperature, the gelation of our MWCNT dispersion is facilitated by increasing the temperature to promote the hydrolysis and condensation of PTMSPMA.

To further verify the chemical bonding interaction induced gelation mechanism, the CGC of MWCNTs dispersed by P3HT-b-PTMSPMAs was investigated with different molecular weight of PTMSPMA($M_{nPTMSPMA}$). When the density of PTMSPMA chain on MWCNT was kept constant via controlling the MWCNT/P3HT-b-PTMSPMA ratio, the intensity of the interaction can be manipulated by changing $M_{nPTMSPMA}$, which determines the number of chemical bonding between MWCNTs. As shown in Table 1, the CGC of MWCNTs decreases dramatically from 1.2 mg/mL to 0.3 mg/mL when $M_{nPTMSPMA}$ increases from 9600 to 13000. However, the CGC remains a constant of 0.3 mg/mL when $M_{nPTMSPMA}$ further increases to 18300. To quantitatively account for these results, Eq 1 is provided below, which is derived from pair connectedness theory which describes the distribution of physical clusters of particles, was applied to establish the connection between percolation threshold and interaction potentials between MWCNTs.

$$\varphi_p = 4Ld^2 \bigg/ \left( 2L^2 d \int_{\gamma^c}^{\frac{\pi}{2}} \exp\left(\frac{\beta w_\perp}{\sin\gamma}\right) \sin(\gamma)\, d\gamma + 4d^2 \int_0^L \exp\left(\frac{\beta w_\perp}{d} z\right) dz \right) \quad \text{Eq 1}$$

In Eq 1, $\varphi_p$ represents the volume fraction (mL CNT/mL solvent) or percolation threshold (volume fraction %) based percolation threshold. In our calculation, we considered the CGC as $\varphi_p$ since the percolation threshold has been proved to be coincided with the CGC. Volume fraction was calculated by dividing mass volume concentration (mg CNT/mL solvent) of the wet gel by the CNT purity (95 wt %) and density (2.1 g/cm$^3$ for small cavity MWCNTs) (Table 1). L and d represent the length (4.85 μm) and diameter (21.6 nm) of MWCNTs, which are assumed to be monodispersed. $\gamma$ is the angle between two interacted MWCNTs with $\gamma^c$ given by Sin $\gamma^c$=d/L. $\beta$=1/kT with k denoting Boltzmann's constant and T representing the temperature. $w\perp$ is the interaction potential between two perpendicular MWCNTs. It is further assumed that $w\perp$ is directly proportional to $M_{nPTMSPMA}$ since $M_{nPTMSPMA}$ determines the number of chemical bonding between MWCNTs. Therefore, $\varphi_p$ and $M_{nPTMSPMA}$ are the only two variables in Eq 1 with an independent fitting parameter of proportionality factor between $M_{nPTMSPMA}$ and $w\perp$.

Figure 3:
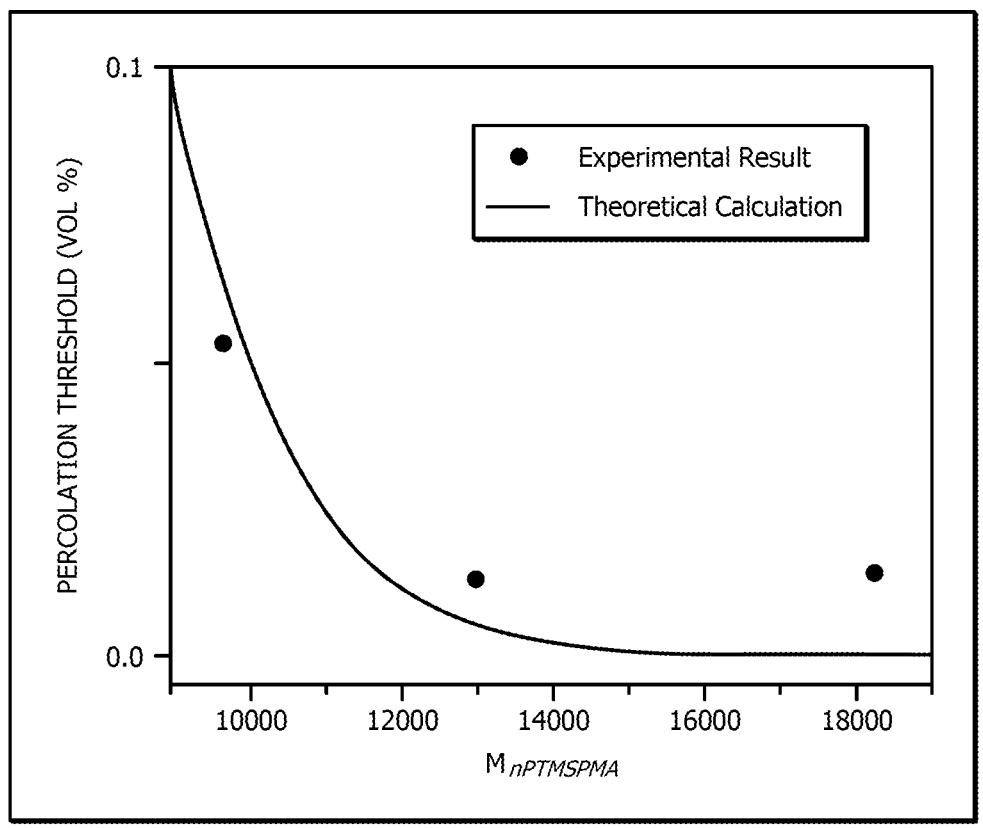
FIG. 3 shows the percolation threshold of MWCNTs as a function of molecular weight of PTMSPMA ($M_{nPTMSPMA}$) with a solid cycle (•) and solid line (-) representing experimental result and theoretical calculation, respectively, according to an embodiment of the invention.

By varying the proportionality factor, $w\perp$=3.98×10$^{-6}$ kT $M_{nPTMSPMA}$ was found to be the best fit. The best fit theoretical percolation threshold plot shown in FIG. 3 indicates an abrupt slope change around $M_{nPTMSPMA}$ of 11,000. When $M_{nPTMSPMA}$ is below 11,000, the percolation threshold decreases dramatically with the increase of $M_{nPTMSPMA}$, whereas, when $M_{nPTMSPMA}$ is above 11000, the increase of $M_{nPTMSPMA}$ only leads to a slight decrease of percolation threshold, which is in good agreement with the experimental results. $w\perp$=3.98×10$^{-6}$ kT $M_{nPTMSPMA}$ can be further applied to estimate interaction potentials between MWCNTs. For P3HT-b-PTMSPMA with $M_{nPTMSPMA}$ of 18300, $w\perp$ was calculated to be 7.28×10$^{-2}$ kT. Consequently, the interaction potential between two MWCNTs was estimated to be in the range of 7.28×10$^{-2}$ kT to 16.35 kT, which corresponding to the situations that two MWCNTs are perpendicularly interacted and parallel interacted over their entire length, respectively. This is a reasonable estimation since previous research has proved that an interaction potential ~kT was sufficient to overcome the thermal energy of two colloidal objects and induce their flocculation. All these results further supported our proposed mechanism that the chemical bonding interactions introduced by the hydrolysis and condensation of PTMSPMA block was the major driving force for the gelation of MWCNTs.

Characterization of MWCNT Aerogels

Chemical bonding interactions not only decrease the CGC of MWCNTs but also chemically crosslink and strengthen the MWCNT wet gel. Therefore, the chemically crosslinked CNT wet gel represents a more advantageous precursor of MWCNT aerogel than physically crosslinked CNT wet gel, which is mechanically weak and some physical interactions may become invalid or diminished after the removal of the solvent. MWCNT wet gel can be freeze-dried to obtain MWCNT aerogels without collapse due to its robust institution. Systematically investigation of the MWCNT aerogel properties was performed on the aerogel derived from P3HT-b-PTMSPMA with $M_{nPTMSPMA}$ of 13000 since such polymer not only led to the lowest CGC but also favored the formation of ultra-light MWCNT aerogel due to its relatively low molecular weight.

An image of the MWCNT aerogel fabricated from a wet gel with MWCNT concentration of 0.3 mg/mL (MWCNT aerogel-0.3) indicated a crack-free monolith. The overall shape of the aerogel, which is cylindrical in this case, was controlled by the mold used for gelation. The bulk density of the MWCNT aerogel was characterized to be 4 mg/cm$^3$, which represents the lowest density ever for the free standing monolithic CNT aerogel and is only slightly larger than the lightest literature recorded aerogels (3 mg/cm$^3$).

Honeycomb structures were built in the ultra-light MWCNT aerogel to improve their mechanical properties. Honeycomb structures are applied in honey bee nests for their excellent structural efficiency, i.e. using less material to construct a given volume architecture with high strength to weight ratio. A modified ice-template approach where MWCNT wet gel was unidirectionally frozen by liquid nitrogen was applied to obtain honeycomb structures in the MWCNT aerogel. Such modified ice-template approach allowed a continuous growth of pseudo-steady-state ice crystals that create an array of micrometer-sized polygonal ice rods parallel with the freezing direction. These ice rods functioned as the templates for the honeycomb structures and were removed by freeze-drying to produce MWCNT aerogel with ordered honeycomb structures. FIGS. 4A-E are scanned SEMs that evidence the morphology and structure of an exemplary MWCNT-based aerogel-0.3 (derived from 3.0 mg/mL MWCNT), according to a disclosed embodiment. The scanned SEM image of MWCNT aerogel 400 in FIG. 4A indicates a macroporous honeycomb morphology comprising honeycomb cells 410 having honeycomb walls 414. The honeycomb walls 414 comprises a plurality of MWCNTs entangled together as shown in FIG. 4B. A median size of the honeycomb cells 410 is generally in a range from 20 to 500 μm and a thickness of the honeycomb walls 414 is generally from 50 to 500 nm. The crosslinking structures holding the honeycomb cells 410 together, such as based on siloxane bond crosslinks, are not shown in the scanned SEM image due to their very small size.

Figure 4A:
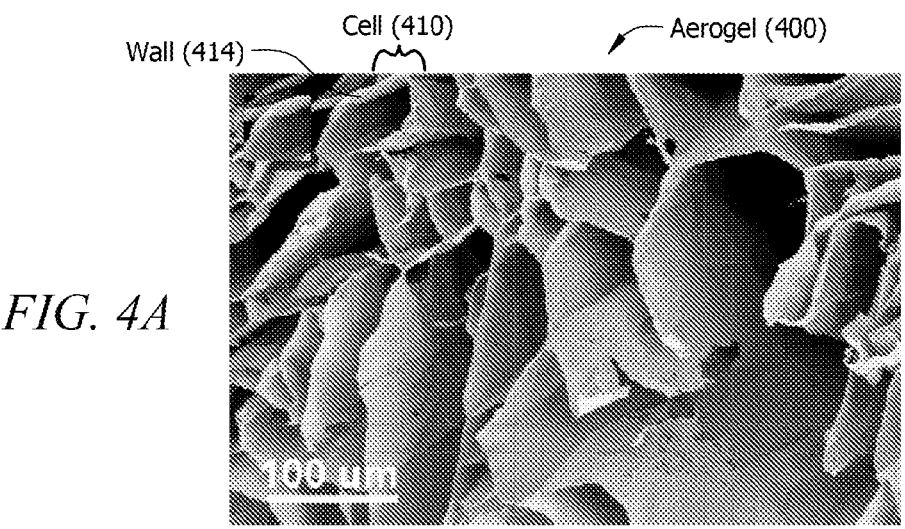
FIGS. 4A-E shows scanned SEM images evidencing the morphology and structure of an example MWCNT aerogel, according to an embodiment of the invention.
Figure 4B:
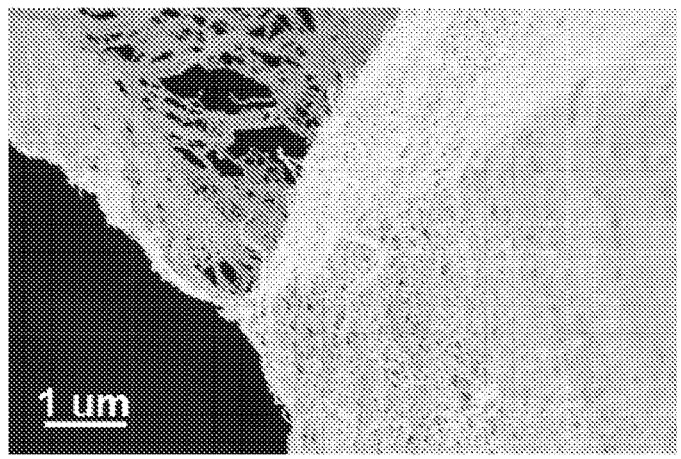

The size of the honeycomb cells 410 shown in FIG. 4A is in the range of 50-150 μm. The scanned SEM image of MWCNT aerogel-0.3 in FIG. 4B of the honeycomb wall 414 evidences that wall is composed of entangled MWCNTs. The honeycomb wall is not uniform and contains defects since the aerogel was build at CGC of MWCNTs. The wall thickness is less than 100 nm, which is exceptionally thin compared with the dimension of the honeycomb cell. Such a high cell to wall ratio, which has been rarely reported for the honeycomb structure, is believed to contribute to the ultra-light nature of disclosed MWCNT aerogels. The inner structure of the MWCNT aerogel-0.3 was investigated by studying its vertical section using SEM.

Figure 4C:
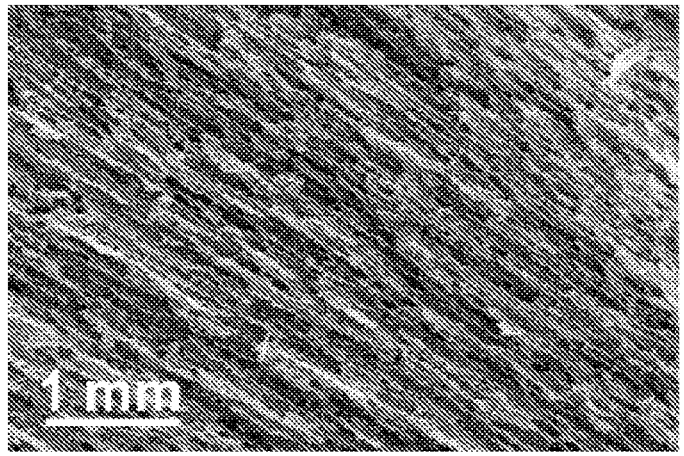
Figure 4D:
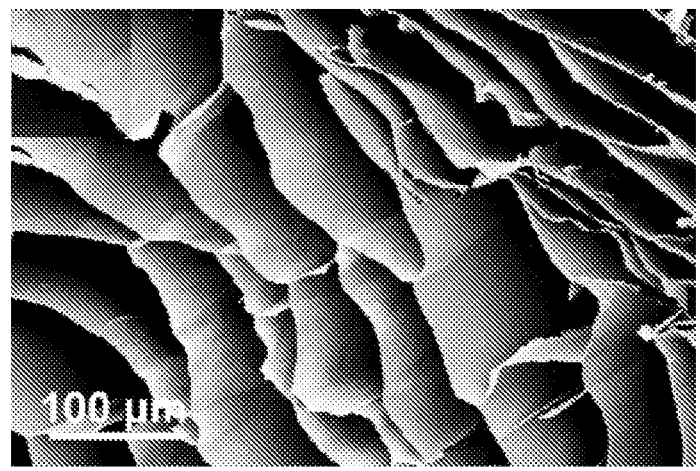
Figure 4E:
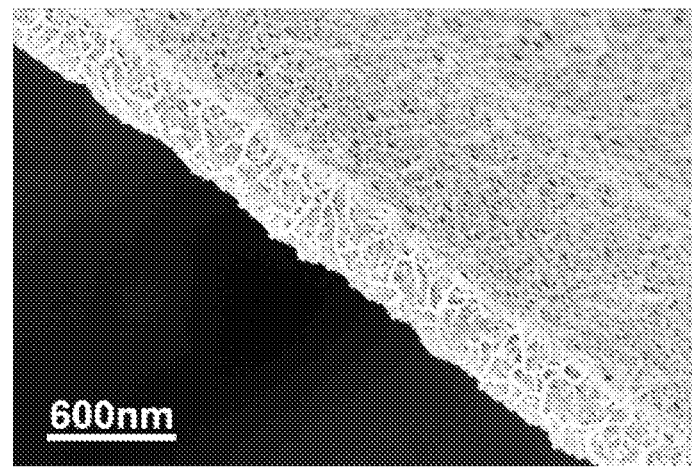
Figure 5A:
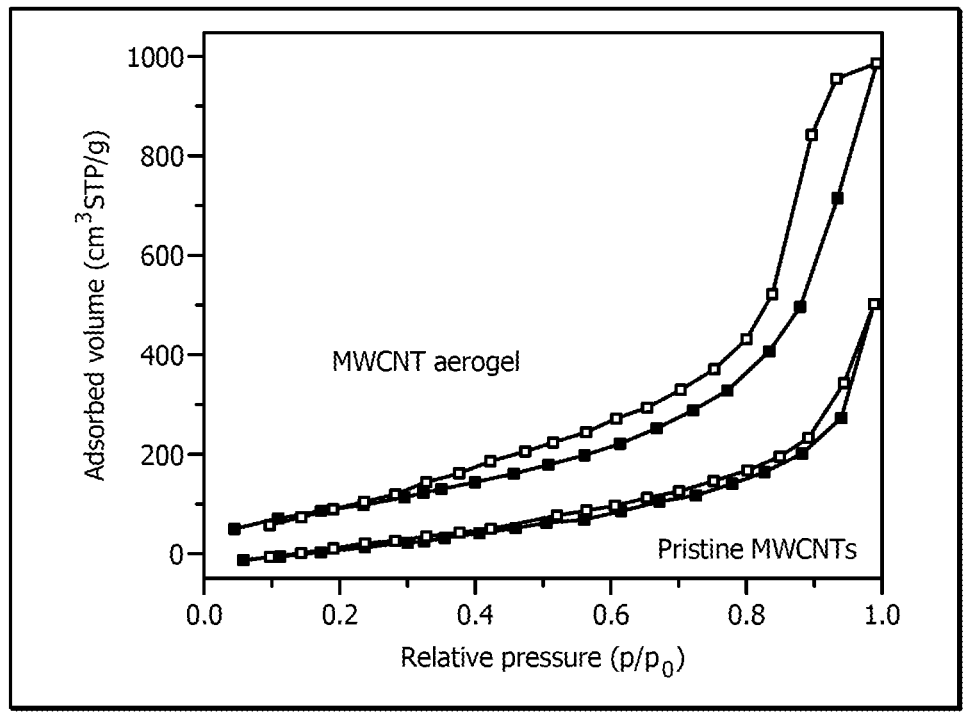
FIGS. 5A and 5B show N$_2$ adsorption (□) and desorption (■) isotherms of MWCNT aerogel and pristine MWCNTs.

As shown in FIG. 4C, straight and parallel channels were observed, confirming parallel growth of ice rod template in the wet gel. To study the influence of MWCNT concentration on the honeycomb structures, a MWCNT aerogel derived from 1.0 mg/mL MWCNT dispersion (MWCNT aerogel-1.0) was also investigated. As shown in FIG. 4D, a more ordered and less defective honeycomb structure was observed with its honeycomb cell dimension comparable with that of MWCNT aerogel-0.3, indicating that the cell dimension was mainly determined by the ice rod template instead of the MWCNT concentration. However, MWCNT concentration had a remarkable influence on the structure of honeycomb walls. As indicated in FIG. 4E the honeycomb wall is more uniform and thicker (~400 nm) than that of MWCNT aerogel-0.3. Besides the unique macroporous honeycomb structure, the example MWCNT aerogel was found to have mesopores developed in the honeycomb walls. The mesoporosity of the MWCNT aerogel-0.3 was quantitatively characterized by nitrogen adsorption/desorption experiments. The adsorption/desorption isomers shown in FIG. 5A represented a IUPAC type IV curve, characteristic of mesoporous (2-50 nm pore diameter) materials. The explicit adsorption/desorption hysteresis loop at the high relative pressure suggested that the MWCNT aerogel was highly mesoporous, the form of the hysteresis loop correspond to a $H_2$ hysteresis indicating an open ended cylindrical texture for the mesopores.

By fitting the isotherms to Brunauer-Emmett-Teller (BET) model, the surface area of the MWCNT aerogel was characterized to be 580 $m^2/g$. The mesopore size distribution which was calculated by the Barrett-Joyner-Halenda (BJH) method, depicted a narrow peak centered at 8 nm (See FIG. 5B). The pristine MWCNTs were also investigated by nitrogen adsorption/desorption experiment to compare with the aerogel. The isotherms shown in FIG. 5A were essentially between IUPAC type II and IV.

Figure 5B:
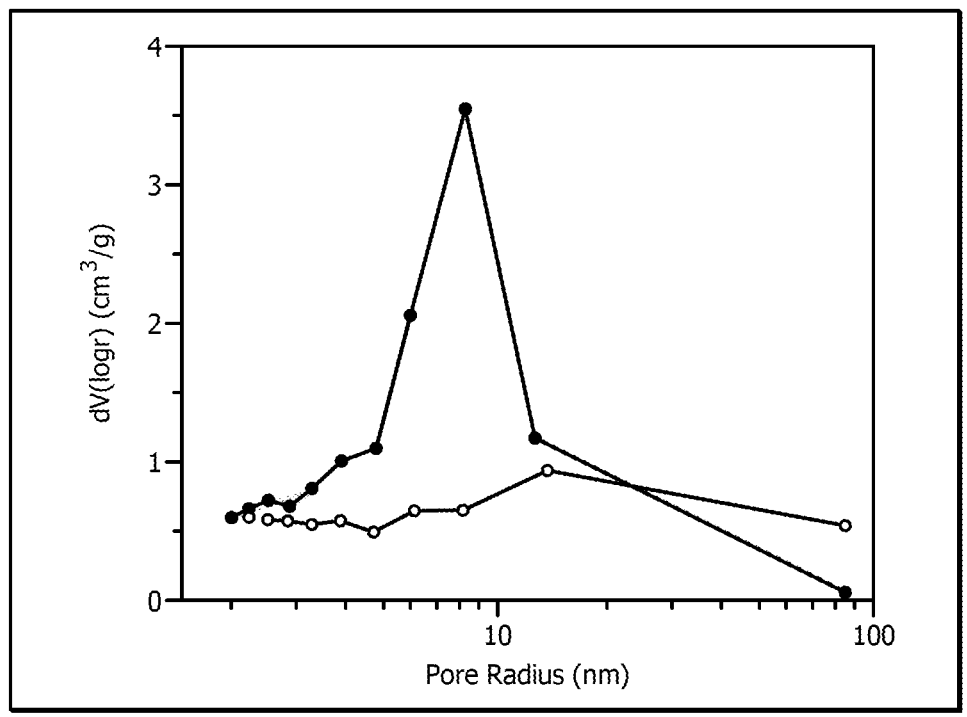

The adsorption isotherm of pristine MWCNTs resembled that of the MWCNT aerogel, signifying that the morphology and structure of MWCNTs in the aerogel were identical to that of pristine MWCNTs. This result suggests that both the structure and intrinsic properties of pristine MWCNTs remain intact during the aerogel fabrication process. The desorption isotherm of the pristine MWCNTs shows less hysteresis compared with the MWCNT aerogel, indicating less porosity and different pore texture. The surface area of pristine MWCNTs was characterized to be 241 $m^2/g$, which was much less than that of the MWCNT aerogel. The surface area difference is caused by the different dispersion level of MWCNTs in two systems. As-produced pristine MWCNTs forms bundles with partial surface area available for nitrogen adsorption, while MWCNTs exist as individual tubes in the aerogel, providing entire surface area. The better dispersion of MWCNTs in aerogel is also indicated by the mesopore size distribution where the mesopore size distribution of MWCNT aerogel gel is much narrower as compared to the as-produced pristine MWCNTs as indicated in FIG. 5B.

In contrast to the fragile conventional aerogels, the MWCNT aerogel-0.3 was found to be mechanically robust as indicated by a compression test. The MWCNT aerogel was found to be compressible down to 10% of its original volume and completely recover to its original shape instantly (e.g. in 10 s or 100 s of milliseconds) after the release of compression. The compressing and recovering cycle was conducted for more than 1000 times without cracking the MWCNT aerogel, indicating its robust mechanical properties. The robustness and compression recoverable properties of the MWCNT aerogel are ascribed to both the outstanding mechanical properties of MWCNTs and the crosslinking nature between MWCNTs. When the compressing stress is applied to the aerogel, the MWCNTs in crosslinked structures tend to bend instead of slipping pass each other. Consequently, the strain energy was stored within the MWCNT aerogel and recovery of the compressed aerogel to its original volume is driven by releasing the strain energy.

The electrical conductivity of the cylindrical shaped MWCNT aerogel-0.3 was measured to be $3.2 \times 10^{-2}$ $S \cdot cm^{-1}$ by a typical four probe conductivity measurement setup. Although the electrical conductivity is high for a material with a density of only 4 $mg/cm^3$, it is still not as high as expected considering the relatively high electrical conductivity of individual MWCNTs. The lower than expected electrical conductivity of MWCNT aerogel is probably due to the presence of the insulating (i.e., dielectric) PTMSPMA at the junction between adjacent MWCNTs.

A high-current pulse method was applied to increase the electrical conductivity of the aerogel. For example, by applying 15 ms 100 mA current pulses at an interval of 30 s, a stepwise increase of the electrical conductivity was observed. The electrical conductivity reached a steady value of 0.67 $S \cdot cm^{-1}$ which is twenty times higher than the initial electrical conductivity after 20 pulses as shown in FIG. 6.

The compression recovery and electrically conductive properties of example MWCNT-based aerogels were found to lead to a pressure responsive property (i.e., the resistance changes with applied pressure). It is expected that disclosed SWNT-based aerogels will also provide a pressure responsive property. The correlation between the MWCNT aerogel resistance and the applied pressure along the honeycomb cell axis direction was investigated.

FIG. 7A shows the resistance of an example MWCNT aerogel decreasing linearly with the applied pressure from 0 to 180 Pa. A detailed investigation in this pressure range indicated that even a pressure as low as 5 Pa can cause a large change in the resistance (inset of FIG. 7A), demonstrating the application of disclosed MWCNT aerogels as an ultrasensitive pressure sensor. The response of aerogel resistance to the applied pressure was found to become smaller when the pressure was higher than 180 Pa. It is believed that such a resistance change profile is due to the pressure-induced increment of the MWCNT network density of the aerogels. Upon the application of the pressure, the aerogels are compressed and the MWCNT network is condensed, leading to the decrease of the resistance. The MWCNT network density in the uncompressed aerogels is equal to the percolation threshold at which the wet gel forms. A small pressure (0 to 180 Pa) increases the MWCNT network density around the percolation threshold, and greatly decreases the resistance of the aerogels.

Such dramatic reduction of resistance is in good agreement with the percolation theory stating that a slight increase of the MWCNT concentration around the percolation threshold can noticeably increase electrical conductivity. In contrast, applying a larger pressure (>180 Pa) onto the MWCNT aerogels generates a MWCNT network density well above the percolation threshold where the conductivity is not sensitive to the MWCNT network density increase according to the percolation theory, leading to a flat pressure vs. resistance curve as shown in FIG. 7A. The resistance change of the MWCNT aerogels in response to repeated loading and unloading of pressure (25 Pa) shown in FIG. 7B evidences an instant resistance decrease (<0.2 S) with the loading of pressure, while, following the unloading of pressure, a complete and fast (<0.4 S) recovery was observed. The cycling measurement indicates that resistance change of the MWCNT aerogels with pressure is reproducible, which is due to the excellent compression recoverable capability of the MWCNT aerogels. Such pressure responsive properties of disclosed MWCNT aerogels make it well suited for pressure sensing.

FIG. 7C shows a simplified schematic for an example aerogel-based pressure sensor 700, according to an example embodiment. Pressure sensor 700 comprises an aerogel sensing element 710, comprising a plurality of supramolecular structures bound to one another, each supramolecular structure comprising a carbon nanotube (CNT) or a graphene comprising structure having an outer surface, and a plurality of polymers or aromatic molecules secured to the outer surface of the CNT or graphene comprising structure, where the plurality of polymers or aromatic molecules have at least one crosslinkable structure. The supramolecular structures are crosslinked together by chemical bonding between the cross linkable structures. A readout circuit 720 is coupled across the aerogel sensing element 710 for reading out resistance data. A processor 730, such as a digital signal processor (DSP), field programmable gate array (FPGA), or application specific integrated circuit (ASIC) is coupled to the readout circuit for receiving the resistance data. The processor 730 has an associated memory 735 that includes calibration data that relates the resistance data to pressure (such as shown in FIG. 7A), wherein the processor 730 calculates a value for pressure applied to the aerogel sensing element 710.

Disclosed MWCNT aerogels also have applications as sorption-based chemoresistance vapor sensors since their hierarchical porous structures not only provide high surface area but also facilitate the analyte diffusion in the aerogel. The response of the MWCNT aerogels resistance to an example chloroform vapor was investigated. FIG. 8A shows the resistance of an example MWCNT aerogel increasing to a saturated value in 0.5 s upon exposure to chloroform vapor, and completely recovering in 0.5 s upon exposure to air even at very low vapor concentration. It is expected that disclosed SWNT-based aerogels will also provide a vapor responsive property. The detection limit was characterized to be 1 ppb. Alternating exposure of the MWCNT aerogels to chloroform vapor and air demonstrated reproducible response and recovery. As a control experiment, a MWCNT thin film (1 μm), which has the same composition as the MWCNT aerogels, was prepared by casting the MWCNT/P3HT-b-PTMSPMA dispersion on a glass substrate. The sensory response of the MWCNT thin film as shown in FIG. 8B demonstrates a significantly slower response (4 to 10 s) and much higher detection limit (37 ppb) as compared to the MWCNT aerogels, indicating that the unique hierarchical porous structure improves the performance of the MWCNT aerogels as a chemoresistance vapor sensor.

FIG. 8C shows a simplified schematic for an example aerogel-based chemical vapor sensor 800, according to an example embodiment. Chemical vapor sensor 800 comprises the aerogel sensing element 710 described above. A readout circuit 720 is coupled across the aerogel sensing element 710 for reading out resistance change data. A processor 730, such as a DSP, FPGA, or ASIC, is coupled to the readout circuit for receiving the resistance change data. The processor 730 has an associated memory 735 that includes calibration data relating the resistance change data to specific chemical vapors (such as shown in FIGS. 8A and 8B), wherein the processor 730 determines if any of the chemical vapors having stored calibration data is present around the aerogel sensing element 710.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above explicitly described embodiments. Rather, the scope of the invention should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. An aerogel, comprising:
   a plurality of supramolecular structures bound to one another, each said supramolecular structure comprising:
      a carbon nanotube (CNT) or a graphene comprising structure having an outer surface, and
      a plurality of polymers or aromatic molecules secured by π-π bonds to said outer surface of said CNT or said graphene comprising structure, said plurality of polymers or aromatic molecules having at least one crosslinkable structure;
   wherein said supramolecular structures are crosslinked together by chemical bonding between said cross linkable structures.

2. The aerogel of claim 1, wherein said plurality of polymers consist essentially of non-conjugated crosslinkable homopolymers.

3. The aerogel of claim 1, wherein said plurality of polymers comprise block copolymers comprising at least one conjugated polymer block and at least one block of a crosslinkable non-conjugated polymer that provides said cross linkable structure, and wherein said conjugated polymer block is non-covalently bonded to said outer surface of said CNT or said graphene comprising structure.

4. The aerogel of claim 3, wherein said block copolymers provides all polymers in said aerogel.

5. The aerogel of claim 3, wherein said conjugated polymer block comprises poly(3-hexylthiophene) (P3HT), poly(aryleneethynylene), polypyrrole, polydioxythiophene, polydioxypyrrole, polycarbazole, polyfuran, polydioxyfuran, polyacetylene, poly(phenylene), poly(phenylene-vinylene), poly(arylene ethynylene), polyaniline, polypyridine, poly(thienyllene vinylene), polysilole, poly(dithensilole), poly(dibenzosilole), poly(dithienopyrrole), poly(thiazole), poly(thieno[3,2-6]thiophene), poly(thieno[3,2-6]thiophene vinylene), poly(aryleneethynylene), polypyrrole, polydioxythiophene, polydioxypyrrole, poly(thienyllene vinylene), polysilole, poly(dithensilole), poly(dibenzosilole), poly(dithienopyrrole), poly(thiazole), poly(thieno[3,2-6]thiophene), poly(thieno[3,2-6]thiophene vinylene), or poly(benzothiadiazole).

6. The aerogel of claim 3, wherein said crosslinkable non-conjugated polymer comprises poly(3-(trimethoxysilyl)propyl methacrylate) (PTMSPMA), poly(3-(trimethoxysilyl)propyl acrylate), poly(glycidyl methacrylate), poly(glycidyl acrylate), or poly(chloromethylstyrene).

7. The aerogel of claim 3, wherein said block copolymers comprise P3HT-b-PTMSPMA.

8. The aerogel of claim 1, wherein said aromatic molecules comprise a plurality of fused benzene rings or a heterocyclic macrocycle.

9. The aerogel of claim 3, wherein said CNT or said graphene comprising structure comprises said CNT, and said CNT has carboxylic acid groups on said outer surface, further wherein said block copolymers or aromatic molecules are covalently bonded to said outer surface.

10. The aerogel of claim 1, wherein said aerogel provides a surface area ≥300 m²/g, a density <15 mg/cm³ and a 25° C. electrical conductivity ≥1×10⁻⁴ S/cm.

11. The aerogel of claim 1, wherein said aerogel comprises a macroporous honeycomb structure comprising honeycomb cells having honeycomb walls, said honeycomb walls comprising a plurality of said CNTs entangled together.

12. The aerogel of claim 11, wherein a median size of said honeycomb cells is in a range from 20 to 500 μm and a thickness of said honeycomb walls is 50 to 500 nm.

13. An aerogel-based sensor, comprising:
   an aerogel sensing element, comprising:
      a plurality of supramolecular structures bound to one another, each said supramolecular structure comprising:
         a carbon nanotube (CNT) or a graphene comprising structure having an outer surface, and
         a plurality of polymers or aromatic molecules secured to said outer surface of said CNT or said graphene comprising structure, said plurality of polymers or aromatic molecules having at least one crosslinkable structure;
      wherein said supramolecular structures are crosslinked together by chemical bonding between said cross linkable structures,
   a readout circuit coupled across said aerogel sensing element for reading out resistance data, and
   a processor coupled to said readout circuit for receiving said resistance data, said processor having an associated memory including calibration data relating said resistance data to a parameter to be sensed, wherein said processor calculates a value for said parameter to be sensed.

14. The aerogel-based sensor of claim 13, wherein said calibration data comprises resistance versus pressure, and said parameter to be sensed comprises pressure.

15. The aerogel-based sensor of claim 13, wherein said calibration data comprises a change in resistance for a plurality of different vapor-phase materials, and wherein said parameter to be sensed comprises a presence of any of said plurality of vapor-phase materials.

16. An aerogel, comprising:
   a plurality of supramolecular structures bound to one another, each said supramolecular structure comprising:
      a carbon nanotube (CNT) or a graphene comprising structure having an outer surface, and
      a plurality of block copolymers secured by π-π bonds to said outer surface of said CNT or said graphene comprising structure, said plurality of block copolymers comprising at least one conjugated polymer block and at least one block of a crosslinkable non-conjugated polymer that provides a cross linkable structure, and wherein said conjugated polymer block is non-covalently bonded to said outer surface of said CNT or said graphene comprising structure;
   wherein said supramolecular structures are crosslinked together by chemical bonding between said cross linkable structures.

* * * * *

UNITED STATES PATENT AND TRADEMARK OFFICE
CERTIFICATE OF CORRECTION

PATENT NO.         : 8,975,326 B2
APPLICATION NO.    : 13/048040
DATED              : March 10, 2015
INVENTOR(S)        : Lei Zhai and Jianhua Zou It is certified that error appears in the above-identified patent and that said Letters Patent is hereby corrected as shown below:

In the Specification

Please correct column 1, lines 15-21, "Statement Regarding Federally Sponsored Research or Development" as follows:

Statement Regarding Federally Sponsored Research

This invention was made with Government support under DMI 0506531 and CBET 0608870 awarded by the National Science Foundation. The Government has certain rights in this invention.

Signed and Sealed this
Fourteenth Day of July, 2015

Michelle K. Lee
*Director of the United States Patent and Trademark Office*